(12) United States Patent
Pauliac et al.

(10) Patent No.: US 12,081,654 B2
(45) Date of Patent: Sep. 3, 2024

(54) METHOD TO AUTHENTICATE A USER AT A SERVICE PROVIDER

(71) Applicant: THALES DIS FRANCE SAS, Meudon (FR)

(72) Inventors: Mireille Pauliac, Meudon (FR); Ly Thanh Phan, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/603,590

(22) PCT Filed: Apr. 7, 2020

(86) PCT No.: PCT/EP2020/059920
§ 371 (c)(1),
(2) Date: Oct. 14, 2021

(87) PCT Pub. No.: WO2020/212207
PCT Pub. Date: Oct. 22, 2020

(65) Prior Publication Data
US 2022/0200795 A1  Jun. 23, 2022

(30) Foreign Application Priority Data

Apr. 18, 2019 (EP) ...................... 19305509

(51) Int. Cl.
*H04L 9/08* (2006.01)
*H04L 9/30* (2006.01)
*H04W 12/069* (2021.01)

(52) U.S. Cl.
CPC .......... *H04L 9/0844* (2013.01); *H04L 9/0861* (2013.01); *H04L 9/3066* (2013.01); *H04W 12/069* (2021.01); *H04L 2209/80* (2013.01)

(58) Field of Classification Search
CPC .... H04L 9/0844; H04L 9/0861; H04L 9/3066
See application file for complete search history.

(56) References Cited

U.S. PATENT DOCUMENTS

| 4,200,770 A | * | 4/1980 | Hellman | ................ H04L 9/0844 |
| | | | | 713/169 |
| 7,062,044 B1 | * | 6/2006 | Solinas | .................. H04L 9/3066 |
| | | | | 708/490 |

(Continued)

OTHER PUBLICATIONS

International Search Report (PCT/ISA/210) and Written Opinion (PCT/ISA/237) mailed on Apr. 30, 2020, by the European Patent Office as the International Searching Authority for International Application No. PCT/EP2020/059920 (WO2020/212207)—[13 pages].

(Continued)

*Primary Examiner* — William S Powers

(57) ABSTRACT

Provided is a method to authenticate a user equipment (UE) at a service provider (SP), when the UE is compliant with either Generic Bootstrap Architecture (GBA) or Authentication and Key Agreement for Applications (AKMA). The user authentication is performed by way of the GBA or AKMA protocol The method relies on the Mobile Network Operator's (MNO) GBA or AKMA authentication framework. It can employ a Diffie-Hellman exchange between the user equipment (UE) and the service provider (SP), leading to a Diffie-Hellman session key ($g^{xy}$), while establishing the GBA or AKMA protocol. The method calculates a final Network Application Function (NAF) or AKMA Application Function key (iNAF_key or iAApF_key) to maintain confidentiality of the communication between the user equipment (UE) and the service provider (SP). It derives this key from the Diffie-Hellman session key ($g^{xy}$) and from the respective protocol's service provider key (Ks_ext/int_NAF or $K_{AF}$).

6 Claims, 2 Drawing Sheets

(56) References Cited

U.S. PATENT DOCUMENTS

| | | | | |
|---|---|---|---|---|
| 8,346,287 | B2* | 1/2013 | King | H04L 63/062 455/433 |
| 8,868,912 | B2* | 10/2014 | Blom | H04L 63/0435 713/171 |
| 2007/0234041 | A1* | 10/2007 | Lakshmeshwar | H04L 9/0833 713/156 |
| 2008/0008265 | A1* | 1/2008 | Fischer | H04L 9/0869 375/309 |
| 2011/0188508 | A1* | 8/2011 | Hjelm | H04W 12/06 370/401 |
| 2011/0320802 | A1* | 12/2011 | Wang | H04W 12/0431 713/2 |
| 2022/0141661 | A1* | 5/2022 | Kievit | H04W 12/04 455/411 |

OTHER PUBLICATIONS

"3rd Generation Partnership Project; Technical Specification Group Services and System Aspects; Generic Authentication Architecture (GAA); Generic Bootstrapping Architecture (GBA) (Release 15)", 3GPP Standard; Technical Specification; 3GPP TS 33.220, 3rd Generation Partnership Project (3GPP), Mobile Competence Centre ; 650, Route Des Lucioles ; F-06921Sophia-Antipolis Cedex ; France—vol. SA WG3, No. V15.4.0—Dec. 18, 2018 (Dec. 18, 2018), pp. 1-93.

Alibaba (China) Group et al: "Key Issue on secure communication between UE and application server", 3GPP Draft; S3-183158-V6-WAS-S3-183092-KEY Issue on Secure Communication Between UE and Application Server, 3rd Generation Partnership Project (3GPP), Mobile Competence Centre ; 650, Route Des Luciole—vol. SA WG3, No. Harbin (China); Sep. 24, 2018-Sep. 28, 2018 Oct. 3, 2018 (Oct. 3, 2018), XP051503325.

Anonymous: "Elliptic curve Diffie-Hellman—Wikipedia, the free encyclopedia", Apr. 20, 2013 (Apr. 20, 2013), XP055146824, Retrieved from the Internet: URL:http://en.wikipedia.org/w/index. php?ti tle=Elliptic curve Diffie%E2%80%93Hellman&oldid 551292197—[retrieved on Oct. 15, 2014] the whole document.

* cited by examiner

METHOD TO AUTHENTICATE A USER AT A SERVICE PROVIDER

FIELD OF THE INVENTION

The present invention relates to a method to authenticate a user at a service provider using a GBA or AKMA protocol to communicate with a user equipment. The invention also pertains to a user equipment and to a service provider device using said method.

BACKGROUND OF THE INVENTION

3GPP specified Generic Bootstrap Architecture (GBA) in 3G to define a framework enabling a service provider to rely on an operator authentication framework to authenticate the users of the service. The initial targeted service was Multimedia Broadcast/Multicast Service and GBA was re-used for other 3GPP services such as Proximity Services. It is used for instance by Public Safety organizations.

The 3G/4G GBA authentication protocol is such that GBA keys established between the service provider and the User Equipment are known by the Mobile Network Operator (MNO). This is an issue raised by several service providers. The problem is that the MNO is able to decipher the communications between the user equipment (UE) and the service provider device, which is known as Network Application Function or NAF in the GBA protocol, and the confidentiality of the communication cannot be guaranteed.

This issue becomes today a critical issue in IoT services and in 5G architecture. There is thus a need to define a new version of GBA fitting with 5G architecture with the explicit requirement that the service provider key, i.e. NAF keys would not be known by the mobile operator.

Consequently, 3GPP created a dedicated study item for 5G Rel-16 named AKMA for Authentication and Key Agreement for Applications based on 3GPP credentials in 5G IoT (3GPP TR 33.835).

The AKMA solution should be modified in order to prevent an MNO from knowing the service provider keys shared between the service provider and the user equipment. It is here highlighted that, at the moment, the AKMA is under study and there is not yet final choice of terminology. Therefore, in the final version of AKMA, some entities or keys may have slightly different names than the ones used in the following.

However, the presence of the MNO in the framework is mandatory since the service provider can rely on the MNO authentication architecture. The MNO ensures that the user is a subscriber of the MNO recently authenticated. There is however no solution to establish service providers keys, i.e. NAF or AKMA Application Function keys, which are independent from the MNO.

Further alternative and advantageous solutions would, accordingly, be desirable in the art.

SUMMARY OF THE INVENTION

The present invention aims at avoiding the MNO to be able to decipher the communications between the UE and the NAF or AKMA Application Function to guarantee the confidentiality of the communication.

The present invention is defined, in its broadest sense, as a method relying on an operator's GBA or AKMA authentication framework while maintaining confidentiality of the communication between the user and the service provider regarding the operator, said method using a Diffie-Hellman exchange between the user equipment and the service provider, leading to a Diffie-Hellman session key, while establishing the GBA or AKMA protocol, said method comprising a step of calculation of a final Network or AKMA Application Function key to be used in further communication between the user equipment and the service provider by derivation from the Diffie-Hellman session key and from the GBA or AKMA protocol's service provider key, the user authentication being performed through the use of the GBA or AKMA protocol.

The solution consists in adding in GBA or AKMA protocol new parameters enabling the establishment of an initial session key between the user equipment (UE) and the service provider device, i.e. its Network Application Function (NAF) server, independently from the home network owned by an MNO. This initial session key specific to the UE and to the NAF is used as input parameter to derive final NAF or AKMA Application Function keys shared between the UE and the NAF, where the "classical" GBA or AKMA keys, i.e. Ks_int/ext_NAF as defined in 3G/4G, are also used as input parameters of the key derivation to ensure that the subscriber was recently authenticated by the MNO according to the GBA or AKMA protocol.

For this solution, Diffie-Hellman exchange is selected as method to establish the initial session key between the UE and the NAF. The use of Diffie-Hellmann guaranties Perfect Forward Secrecy. Taking into account quantum computer attacks, 3GPP decided that there is no immediate need for Rel-16 to transition to quantum safe algorithms. The proposed solution provides keys independence and also perfect forward secrecy, which is an important security feature in the design of a protocol.

The invention can advantageously be based on elliptic curves.

The invention also concerns a GBA or AKMA protocol's compliant user equipment adapted to authenticate a user at a service provider using a GBA or AKMA protocol, the authentication relying on an operator's GBA or AKMA authentication framework while maintaining confidentiality of the communication between the user equipment and the service provider regarding the operator, said user equipment having further cryptographic material to establish a Diffie-Hellman exchange with the service provider, leading to a Diffie-Hellman session key, while establishing the GBA or AKMA protocol, said user equipment having a derivation module adapted to derive a final Network or AKMA Application Function key to be used in further communication with the service provider by derivation from the Diffie-Hellman session key and from the GBA or AKMA protocol's service provider key, the user authentication being performed through the use of the GBA or AKMA protocol.

This user equipment establishes a communication with the service provider's device that is protected using the Diffie-Hellman session key and authenticated using the GBA or AKMA protocol.

The invention relates at last to a GBA or AKMA protocol's compliant service provider's device adapted to authenticate a user having a GBA or AKMA compliant user equipment using a GBA or AKMA protocol, the authentication relying on an operator's GBA or AKMA authentication framework while maintaining confidentiality of the communication between the user equipment and the service provider regarding the operator, said service provider's device having further cryptographic material to establish a Diffie-Hellman exchange with the user equipment, leading to a Diffie-Hellman session key, while establishing the GBA or AKMA protocol, said service provider's device having a derivation module adapted to derive a final Network or AKMA Application Function key to be used in further communication with the user equipment by derivation from the Diffie-Hellman session key and from the GBA or AKMA protocol's service provider key, the user authentication being performed through the use of the GBA or AKMA protocol.

Such a service provider's device is adapted to communicate with a user equipment of the invention to allow a confidential and efficient authentication of the user.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
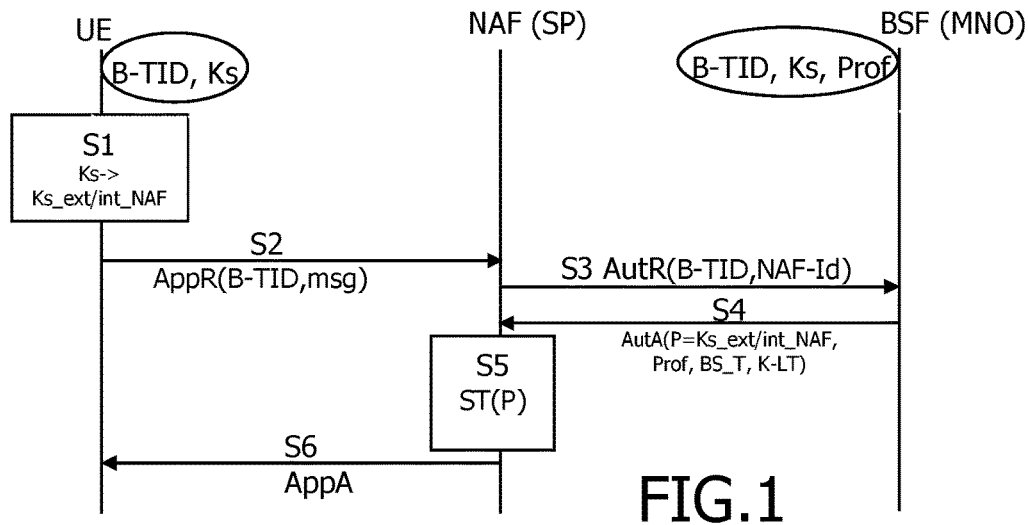
FIG. 1 represents a time diagram of a GBA based authentication method according to the prior art.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 represents a time diagram of a GBA based protocol according to the prior art. This protocol is based on the ability for a Network Application Function NAF of a service provider SP to rely on a Mobile Network Operator MNO to authenticate a user. This is done using a bootstrap B-TID that is received at the NAF from a user equipment UE of a user which is registered at a Bootstrapping Server Function BSF of the MNO thanks to prior authentication of the subscriber by the MNO.

More precisely, for the implementation of the GBA protocol, the user equipment UE stores at least a bootstrap B-TID and a master key Ks resulting from a dedicated authentication of the user by the MNO.

In a step S1, the user equipment UE derives a NAF key Ks_ext/int_NAF from the master key Ks.

In a step S2, it sends an application request AppR including the bootstrap B-TID and an application specific dataset in a form of a message msg to the NAF of the service provider SP.

This triggers a step S3 of forwarding, in an authentication request AutR, the bootstrap B-TID with an identifier NAF-Id of the NAF to the BSF of the MNO.

For the GBA implementation, the BSF stores as many bootstrap as registered users. It also stores the master key Ks which remains unknown by the NAF of the service provider SP but which enables the derivation of the user's final NAF keys. It stores at last application specific part of user profile Prof.

While receiving a bootstrap B-TID and a NAF identifier NAF_Id, the BSF retrieves the NAF key Ks_ext/int_NAF, generally by derivation of the master key using the NAF identifier, retrieves a bootstrap time BS_T as allocated at the bootstrap phase when the bootstrap key Ks was computed and a key lifetime K_LT. It also retrieves the application specific part of user profile Prof. The BSF then sends an authentication answer AutA including all these parameters P to the NAF in a step S4.

All parameters P are then stored ST(P) at the NAF in a step S5 and an application answer AppA is sent back to the user equipment UE. Both entities the NAF and the user equipment UE are now sharing a same key, the NAF key Ks_ext/int_NAF. Next communications for the application provided by the service provider SP to the user equipment UE are done using this derived NAF key.

Figure 2:
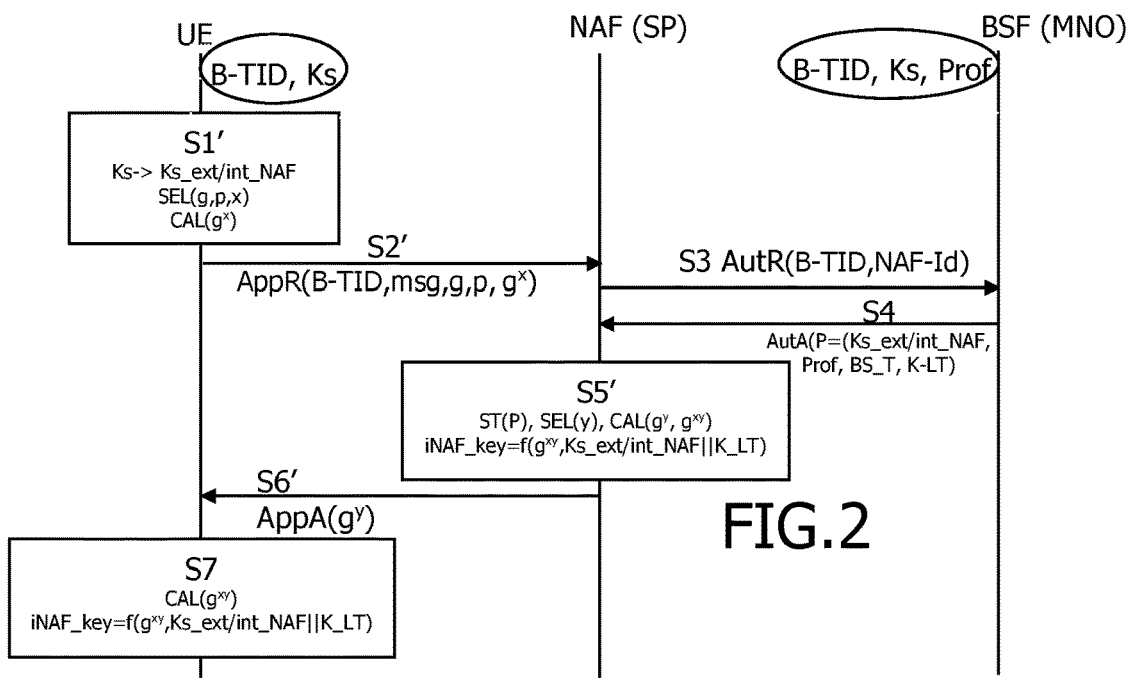
FIG. 2 represents a time diagram of a GBA based authentication method according to the invention.

FIG. 2 discloses the method of the invention. For the need of the invention, the user equipment UE needs to access to a random number generator.

Figure 3:
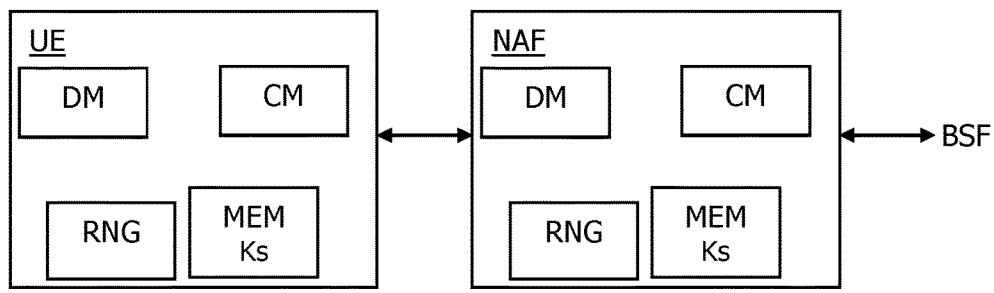
FIG. 3 schematically shows a GBA compliant user equipment of the invention in communication with a service provider's device of the invention.

An exemplary user equipment UE is shown on FIG. 3. It comprises a derivation module DM to derive keys at the different steps of the invention. It comprises a cryptographic module CM able to make calculation using the different manipulated keys. A memory MEM enables to store at least the master key Ks, the bootstrap B-TID. It also comprises a random number generator RNG.

According to the invention, the user equipment UE, at the time of derivation of a NAF key to open an application at a service provider, also chooses parameters for a Diffie Hellman exchange to be establish with the NAF. The method of the invention thus comprises a step S'1 including the derivation of the NAF key Ks_ext/int_NAF and a selection SEL(g,p,x) of a generator or base g, of a primary number p and of a random x according to the Diffie Hellman protocol. The user equipment UE also calculates the exponentiation of g: $g^x$.

Then, in a step S2', the user equipment UE sends an application request AppR comprising not only the bootstrap B-TID and the application specific dataset msg, but also the base, the primary number which serves as a modulo and the value of the exponentiation $g^x$.

Next steps S3 and S4 are identical to the ones of the GBA or AKMA classical protocol. The BSF is solicited to authenticate the user. The derived NAF key Ks_ext/int_NAF is thus returned with the other authentication parameters to the NAF.

In a step S5', according to the invention, the parameters as returned by the BSF are stored ST(P) and then the NAF chooses a random y and calculates $g^y$ and $g^{xy}$.

For the purpose of the invention, the NAF thus comprises at least the same modules as the user equipment UE to implement the Diffie Hellman exchange, a derivation module DM, a cryptographic module CM, a random number generator RNG and a memory MEM as schematically shown on FIG. 3.

At last, the NAF calculates an inventive NAF key iNAF_key according to the following formula:

iNAF_key=f($g^{xy}$, Ks_ext/int_NAF∥K_LT) using the received $g^x$, the random y as chosen by the NAF, and the derived NAF key Ks_ext/int_NAF as received from the BSF. A key life time K_LT is also added to metadata for this inventive NAF key iNAF_key.

Then in a step S6', an application answer AppA is sent back to the user equipment comprising the $g^y$ value.

In a step S7, the user equipment UE is enabled to calculate $g^{xy}$ and the inventive NAF key iNAF_key using the calculated $g^{xy}$ and the NAF key Ks_ext/int_NAF derived at step S1'.

Then all applicative communication with the service provider are performed using the inventive NAF key iNAF_key.

Figure 4:
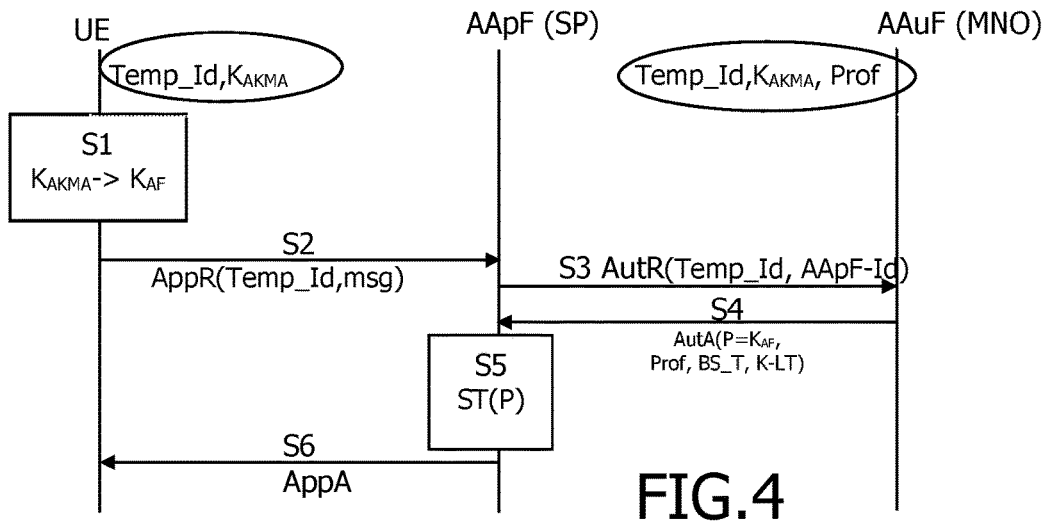
FIG. 4 represents a time diagram of an AKMA based authentication method according to the prior art.
Figure 5:
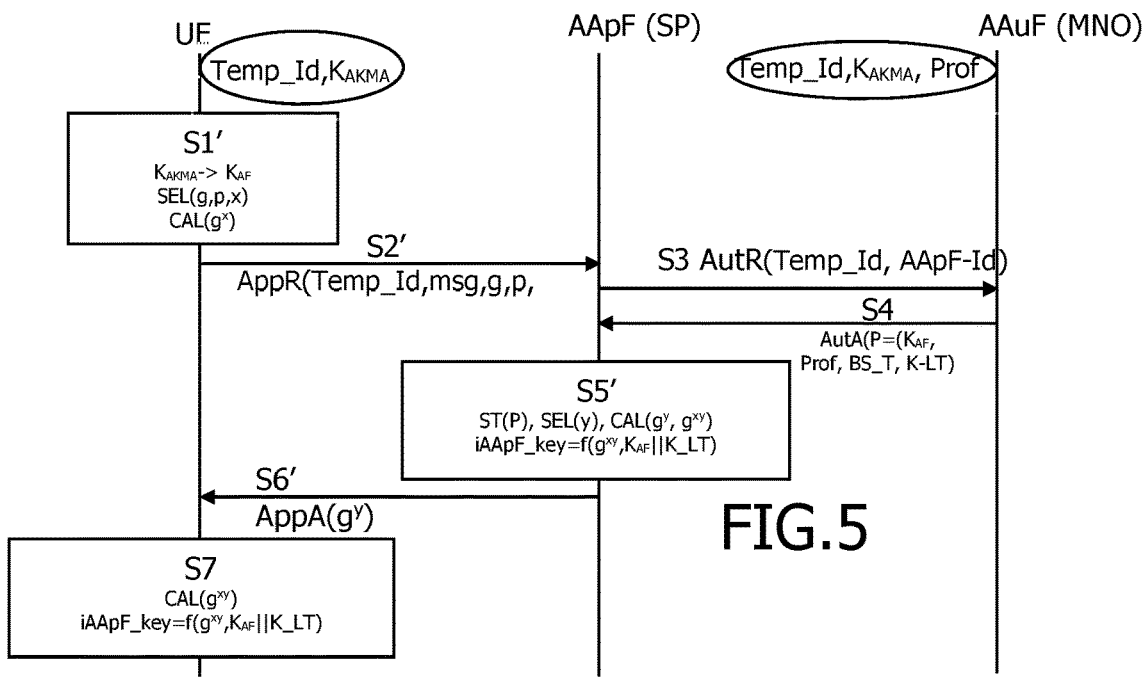
FIG. 5 represents a time diagram of an AKMA based authentication method according to the invention.
Figure 6:
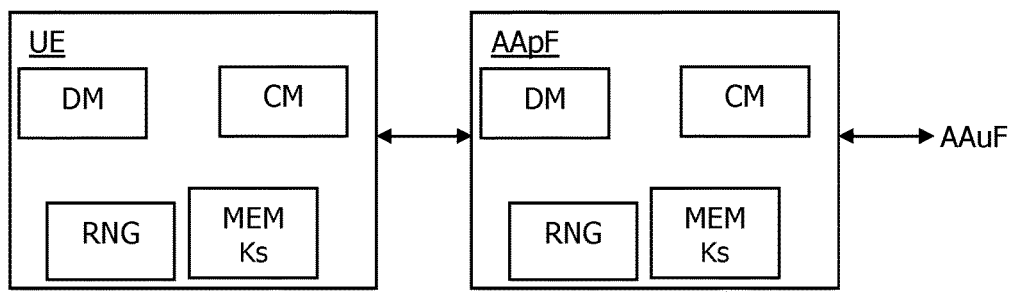
FIG. 6 schematically shows an AKMA compliant user equipment of the invention in communication with a service provider's device of the invention.

FIGS. 4, 5 and 6 shows the application of the method of the invention with the AKMA protocol. This protocol is based on an architecture similar to the GBA one. In the AKMA architecture, the NAF is replaced by an AKMA Application Function AApF, the BSF by an AKMA Authentication Function AAuF. The bootstrap key Ks is an AKMA key $K_{AKMA}$. The bootstrapping identifier B_TID is now a temporary identifier Temp_Id. The equivalent of the Ks_ext/int for the user equipment is now here generically called Application Function key $K_{AF}$. The final NAF key as obtained with the invention is named final or inventive AKMA Application Function key iAApF instead of final or inventive NAF key iNAF_key. The mechanism is otherwise the same than explained in the description of FIGS. 1 to 3.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to authenticate a user by a service provider while maintaining confidentiality of a communication between a user equipment and the service provider to prevent an operator from knowing a service provider key shared between the service provider and the user equipment, wherein the user equipment comprises a random number generator, a derivation module configured to derive keys, a cryptographic module able to make calculations based on the keys, A memory configured to store a bootstrapping transaction identifier (B-TID) and a master key resulting from a dedicated authentication of a user by the operator, the method comprising:
deriving, by the user equipment, a derived Network Application Function (NAF) key from the master key,
choosing, at the time of derivation of the derived NAF key, a base number g, a primary number p and a first random number x for a Diffie Hellman exchange to be established with the NAF in accordance with a Diffie Hellman protocol,
calculating, by the user equipment, $g^x$,
sending, by the user equipment, an application request including the B-TID, an application specific dataset, and the base number g to a NAF server of the service provider,
forwarding, in an authentication request, the B-TID with an identifier of the NAF server to a Bootstrapping Server Function (BSF) of the operator,
while receiving the B-TID and the NAF identifier, retrieving by the BSF a plurality of parameters, wherein the parameters comprise the derived NAF key, a bootstrap time, and an application specific part of a user profile,
sending, by the BSF, an authentication answer to the NAF server, wherein the authentication answer includes the parameters,
storing the parameters at the NAF server,
choosing, by the NAF server, a second random number y,
calculating, by the NAF server, an inventive NAF key using the received g, the second random number y as chosen by the NAF, and the derived NAF key as received from the BSF using the function f(gxy, Ks ext/int NAF∥K_LT), wherein key Ks ext/int NAF is the derived NAF key and K_LT is the key life time,
sending an application answer comprising the value of $g^y$ to the user equipment, and
calculating, by the user equipment, the value of $g^{xy}$ and the inventive NAF key using the calculated $g^{xy}$ and the derived NAF key, and
performing all applicative communication through the operator with the service provider using the inventive NAF key.

2. The method of claim 1, further comprising that all communication with the service provider is performed using the inventive NAF key.

3. The method of claim 1, wherein the NAF comprises a derivation module, a cryptographic module, a random number generator and a memory.

4. The method of claim 1, wherein the operator uses a GBA or AKMA authentication framework.

5. The method of claim 4, Wherein when the authentication framework of the operator is an AKMA authentication framework, the NAF is replaced by an AKMA Application Function, the BSF is replaced by an AKMA Authentication Function. The master key is replaced by an AKMA key, The B_TID is replaced by a temporary identifier, the derived NAK key for the user equipment is replaced by a first Application Function key. and the inventive NAF key is replaced by a second Application Function key.

6. The method of claim 1, wherein the derived NAF key is derived from the master key using the NAF identifier.

* * * * *